United States Patent [19]

Rife

[11] 4,194,795
[45] Mar. 25, 1980

[54] SEAL PROTECTOR FOR A SEALED BEARING ROCK BIT

[75] Inventor: Dwight A. Rife, Mission Viejo, Calif.

[73] Assignee: Smith International, Inc., Newport Beach, Calif.

[21] Appl. No.: 881,618

[22] Filed: Feb. 27, 1978

[51] Int. Cl.² ............................................. F16C 33/76
[52] U.S. Cl. .................................... 308/8.2; 277/92; 308/36.1
[58] Field of Search .................... 308/8.2, 36.1–36.5, 308/187.1, 187.2, 187, 78, 106; 277/92–95

[56] References Cited

U.S. PATENT DOCUMENTS

| | | | |
|---|---|---|---|
| 2,797,067 | 6/1957 | Fisher | 308/8.2 |
| 3,195,421 | 7/1965 | Rumsey et al. | 277/92 X |
| 3,761,145 | 9/1973 | Schumacher, Jr. | 308/8.2 |

Primary Examiner—Douglas C. Butler
Attorney, Agent, or Firm—Robert M. Vargo

[57] ABSTRACT

A rock bit having a seal protector positioned within each seal gland for eliminating shale packing behind the seal and restricting the axial movement of the seal. The rock bit includes a bit body having a plurality of legs depending therefrom, each leg having a cutter rotatively mounted thereon. A seal is positioned between each cutter and leg to prevent lubricant from leaking to the exterior of the bit and prevent drilling fluid, shale or the like from entering into the bearing area. Each seal protector comprises an annular ring located within each gland on the side of the seal facing the exterior of the bit. The annular ring extends the full length of the gland between the cutter and leg for preventing the shale and other debris from passing therethrough to attack the seal. The annular ring also fully extends across the clearance between the seal and the gland width to restrict the seal from axial movement due to internal and external pressure differentials and prevent the seal from bunching or wrapping up. The annular ring further includes an inner contoured face made of a low coefficient of friction material which mates with the exterior side of the seal in order to reduce the friction between the cutter and the leg and extend the life of the seal.

13 Claims, 5 Drawing Figures

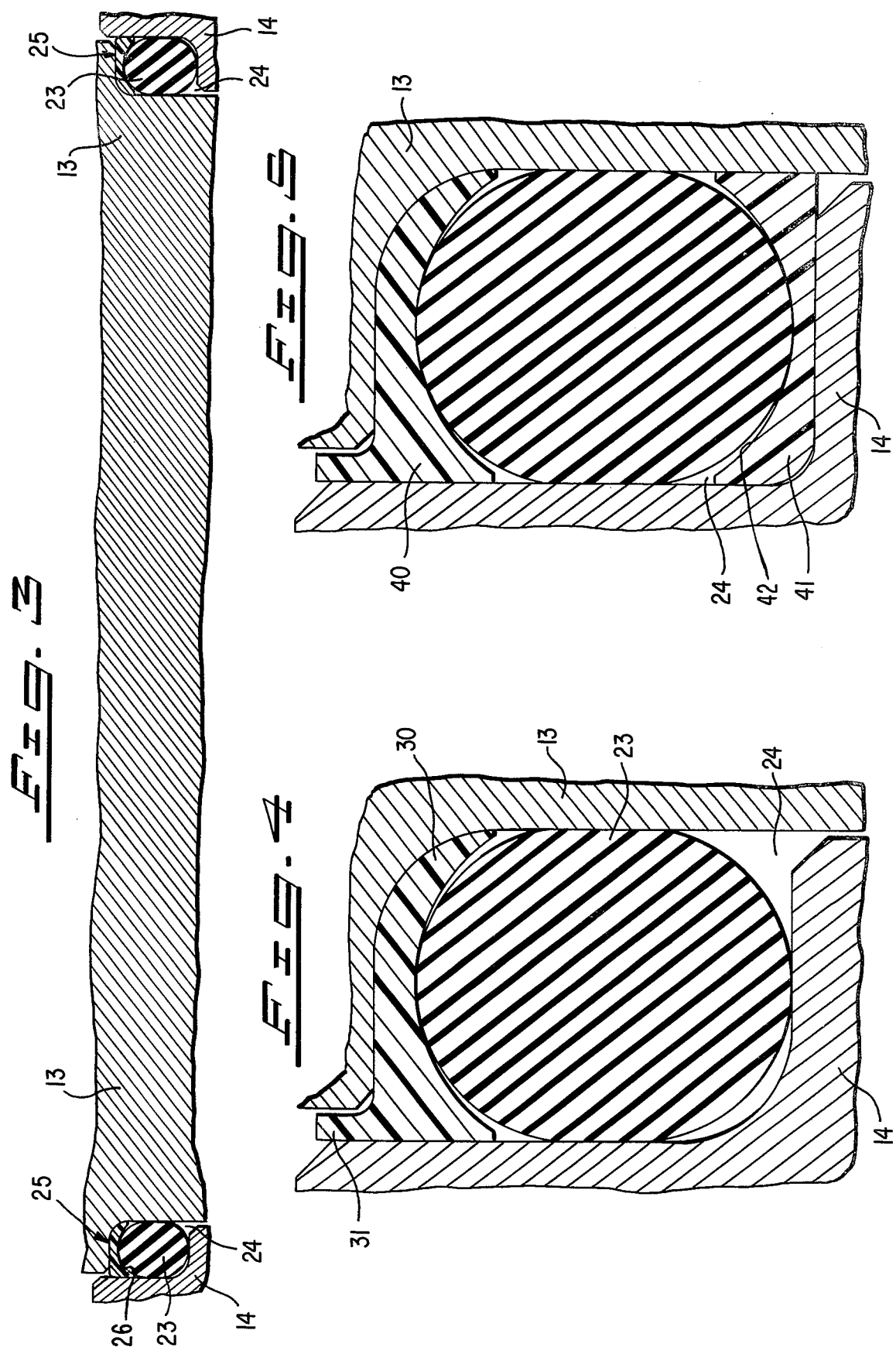

SEAL PROTECTOR FOR A SEALED BEARING ROCK BIT

BACKGROUND OF THE INVENTION

1. Field of the Invention

The present invention relates generally to the art of earth boring and, more particularly, to rotary rock bits having a sealed lubrication system.

2. Description of the Prior Art

A rotary rock bit generally consists of a main bit body adapted to be connected to a rotary drill string. A conventional bit usually includes two or more legs integrally connected to form a bit body. Each leg includes a cutter rotatively mounted on a journal pin extending from the leg. Bearing assemblies are provided between the cutter and the journal pin to promote rotation of the cutter. Either milled teeth, tungsten carbide inserts or the like are provided on the outer surface of the cutter for disintegrating the formations as the bit and cutter rotate.

A sufficient supply of lubricant is provided to the bearing assemblies by means of a reservoir having passageways communicating with the bearing assemblies. A seal such as an O-ring seal is positioned within a gland between each cutter and leg to prevent lubricant from leaking to the exterior of the bit and prevent drilling fluid and other matter from entering into the bearing area. Such a lubrication system is shown in U.S. Pat. Nos. 3,917,028 and 4,061,376.

A problem encountered with seal bearing bits is that in certain drilling environments such as drilling through shale, the shale would work its way across the sealing face of the O-ring seal to attack the O-ring seal and cause undue wear thereon. This shale packing further acts on the seal assembly to effectively increase the squeeze on the O-ring seal thereby shortening its life because of increased friction.

Another problem encountered with sealed bearing bits is that O-ring seals tend to move axially within the gland due to the internal and external pressure differential while drilling. This movement is a wave-type movement (sometimes called Marcelling) which is detrimental to the seal because, during such movement, the O-ring seal has a tendency to bunch or wrap up.

Still another problem with sealed bearing bits is that in any environment the friction on the outer diameter of the O-ring seal is excessive and creates undue wear thereon.

SUMMARY OF THE INVENTION

The present invention obviates the above-mentioned shortcomings by providing a seal protector that prevents shale and other debris from attacking the seal and restricts the wave-like movement of the seal during operation.

In its broadest concept, the present invention pertains to a seal bearing bit comprising a main bit body having at least one leg journal having a cutter rotatively mounted thereon. A lubrication system is provided within the bit body for supplying lubricant via passageways to the bearing assemblies between the journal and the cutter. A seal is positioned within an annular gland between the cutter and the leg to prevent lubricant from leaking to the exterior of the bit. An annular ring is positioned within the gland adjacent the side of the seal facing the exterior. The annular ring extends the full depth of the gland which includes the clearance between the cutter and the leg. The annular ring further extends across the axial clearance between the seal and gland width.

An advantage of the present invention is that the full glandular depth extension of the annular ring prevents shale and other debris from attacking the seal. Another advantage is that by completely filling the axial clearance in the gland with respect to the seal, the annular ring functions to restrict the axial movement of the seal.

Another aspect of the present invention is that the annular ring has an inner face contoured to the shape of the outer seal face to mate therewith. The annular ring is made of a material having a low coefficient of friction to reduce wear on the outer seal face and reduce the friction of the cutter rotation.

Another advantage of the present invention is that the restriction of the seal movement and the low coefficient of friction enables the seal to be designed with a lower squeeze with respect to the gland dimensions.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 3 is an enlarged, fragmentary, sectional view of a leg seal assembly incorporating the seal protector of the present invention;

FIG. 4 is an enlarged, fragmentary, sectional view of a second embodiment of the seal protector; and FIG. 5 is an enlarged, fragmentary, sectional view of a third embodiment of the seal protector.

DESCRIPTION OF THE PREFERRED EMBODIMENT

Figure 1:
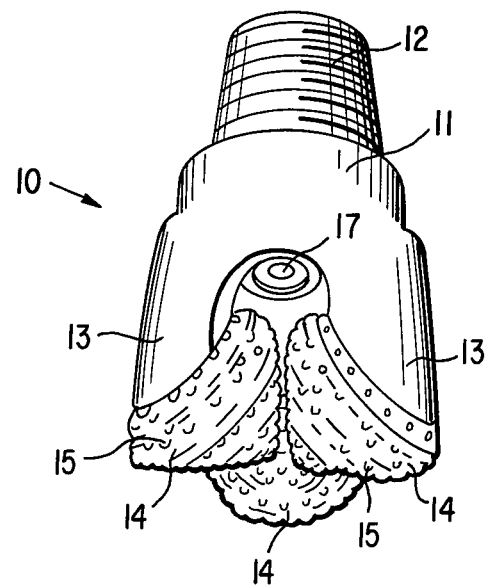
FIG. 1 is a perspective view of a sealed bearing rotary rock bit.

Referring now to the drawings, FIG. 1 illustrates a three cone rotary rock bit, although, the invention can be utilized in other types of rock bits. The rotary rock bit, generally indicated by arrow 10, comprises a bit body 11 having an upper threaded portion 12 for connection to the lower end of a rotary drill string (not shown). Extending downwardly from the bit body 11 are three substantially identical legs 13. The lower end of each of the legs is provided with an extended journal pin, details of which will be discussed hereinafter.

A rotary cone cutter 14 is rotatively positioned on each journal pin of a respective leg 13. Each cone cutter 14 includes a cutting structure 15 on its outer face which is adapted to disintegrate the formations as the bit is rotated and moved downward. The cutting structure 15 is shown in the form of tungsten carbide inserts, however, it is to be understood that other cutting structures such as milled steel teeth formed on the cone cutters may be utilized.

The bit 10 further includes a central passageway (not shown) extending along the center axis of body 11 to allow drilling fluid to enter from the upper section of the drill string immediately above and pass downward through three jet nozzles 17, one of which is shown in FIG. 1.

In operation, the drill bit 10 is connected as a lower member of a rotary drill string (not shown) and lowered into a well bore until the rotatable cone cutter 14 engage the bottom of the well bore. Upon engagement with the bottom well bore the drill string is rotated, rotating bit 10 therewith. Drilling fluid is forced down through the interior passage of the rotary drill string and continue through the central passageway of the bit 10, passing through the three nozzles 17, past the cutting structure 15 of the cutter 14 to the bottom of the well bore, and then upwardly into the annulus between the rotary drill string and the wall of the well bore carrying with it the cuttings and debris from the drilling operations.

Figure 2:
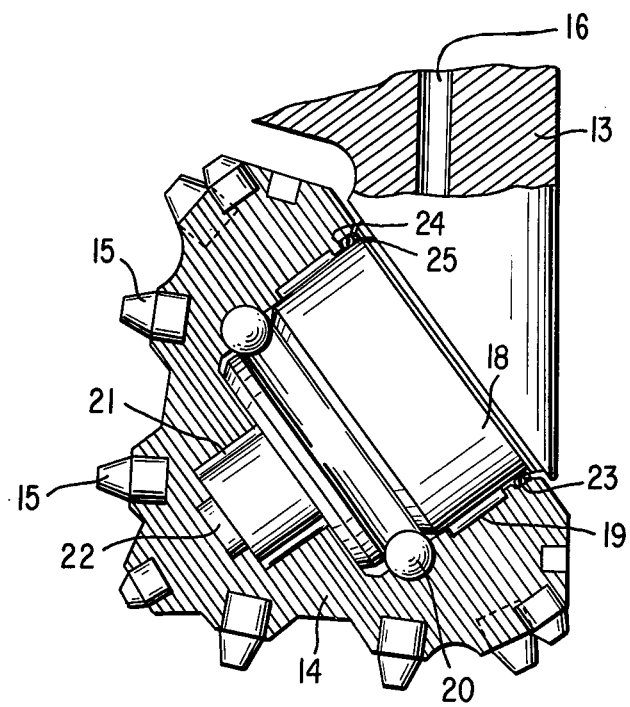
FIG. 2 is a fragmentary sectional view of one leg of a rock bit illustrating the seal protector in accordance with the present invention.

Referring now to FIG. 2, one leg 13 of an earth boring bit is shown. The cone cutter 14 is rotatively mounted on a journal pin 18 of the leg 13 and is adapted to disintegrate earth formations as the bit is rotated. This is accomplished by the tungsten carbide inserts 15 located on the outer surface of the cutter 14 which contacts and disintegrates the formations.

A plurality of bearing assemblies are located in the bearing area between the cutter 14 and the journal pin 18. Although various combinations of roller bearings, ball bearings, and friction bearings can be utilized, the bearing system illustrated includes a friction bearing 19, a series of ball bearings 20, a friction bearing 21 and a thrust button 22. Each leg also includes a conventional lubrication system comprising a reservoir (not shown) located in the upper portion thereof. The reservoir communicates with a passageway 16 which, in turn, is interconnected to a plurality of passageways in the journal pin 18 to provide lubricant to the bearing assemblies 19, 20, and 21. An O-ring seal 23 is positioned between the cutter 14 and the journal pin 18 and is located within an annular cavity 24 forming a portion of the seal gland. The O-ring seal 23 retains lubricant in the bearing area around the bearing assemblies and also functions to prevent any materials in the well bore from entering the bearing area.

FIG. 2 also illustrates a seal protector, generally indicated by arrow 25, which is also located in the annular gland 24 of each cone cutter 14. The seal protector 25 comprises an annular ring located with the gland 24 on the side of the O-ring seal 23 facing the exterior of the bit.

As can be more clearly seen in FIG. 3, the seal protector 25 extends the full depth of the gland between the leg 13 and the cutter 14. This extension enables the seal protector 25 to prevent shale and other debris from passing therethrough to attack the O-ring seal 23.

The seal protector 25 also extends across the clearance between the O-ring seal 23 and the gland 24 width. This enables the seal protector 25 to restrict the O-ring seal 23 from axial movement due to internal and external pressure differentials and prevent the O-ring seal 23 from bunching or wrapping up.

The seal protector 25 further includes an inner contoured face 26 made of Teflon or similar material which mates with the exterior side of the O-ring seal 23 in order to reduce the friction between the engaging parts and extend life of the O-ring seal 23.

FIG. 4 illustrates a second embodiment of the seal protector, indicated by arrow 30, which is similar to the seal protector 25 except seal protector 30 further includes a lip portion 31 that functions to extend out of the gland 24 and into the area between the cutter 14 and the journal pin 18. The lip portion 31 functions to provide additional mass at a critical location to further assist in preventing shale or other debris from passing therethrough.

FIG. 5 illustrates a third embodiment of the present invention. This embodiment utilizes two seal protectors 40 and 41 located with the gland 24 on both sides of the O-ring seal 23. The outer seal protector 40 functions similarly to the other seal protectors 25 and 30 while seal protector 41 also includes a seal bearing Teflon surface 42 having a lower coefficient of friction than the metal gland 24. As a result the O-ring seal 23 frictionally engages the Teflon seal protectors 40 and 41 rather than normally engaging the metal gland surfaces. Because of the lower friction involved, the O-ring seal 23 can be dimensioned to have a lighter squeeze than an O-ring that engages the metal gland.

It should be noted that various modifications can be made to the assembly while still remaining within the purview of the following claims.

What is claimed is:

1. A rotary rock bit comprising:
   a main bit body having at least one leg extending downwardly therefrom, each leg having a journal projecting radially inward therefrom, each journal having an outwardly facing bearing surface;
   a cutter rotatively mounted on each said leg journal, each cutter having an inwardly facing bearing surface engaging the bearing surface of said registering leg journal;
   lubrication means for supplying lubricant to the bearing surfaces between each cutter and journal assembly;
   an annular seal positioned within a gland between each cutter and journal assembly for preventing lubricant from leaking to the exterior of the assembly, said seal having a side which faces the exterior of the assembly;
   an annular ring positioned within each gland adjacent said side of the seal, each annular ring extending the full depth of the respective gland that the ring is located in, thereby preventing exterior matter from passing therethrough to attack the seal.

2. The combination of claim 1 wherein each annular ring further extends across the axial clearance between the seal and the gland width, thereby restricting the axial movement of the seal.

3. The combination of claim 2 wherein each annular ring further includes a lip portion extending out of the gland into the clearance between the cutter and the journal.

4. The combination of claim 1 wherein each annular ring includes a face adjacent a respective seal which is contoured to the shape of the mating seal face.

5. The combination of claim 4 wherein each annular ring is made of a material having a low coefficent of friction.

6. The combination of claim 1 wherein said seal is an O-ring seal.

7. The combination of claim 6 wherein each O-ring seal has a squeeze of less than ten percent by volume.

8. The combination of claim 1 further including a second annular ring positioned within each gland on the opposite side of the seal that the first annular ring is located.

9. The combination of claim 8 wherein each second annular ring includes a face adjacent a respective seal which is contoured to the shape of the mating seal face.

10. The combination of claim 9 wherein each second annular ring is made of a material having a low coefficient of friction.

11. A rotary rock bit comprising:
- a main bit body having at least one leg extending downwardly therefrom, each leg having a journal projecting radially inward therefrom, each journal having an outwardly facing bearing surface;
- a cutter rotatively mounted on each said leg journal, each cutter having an inwardly facing bearing surface engaging the bearing surface of said registering leg journal;
- lubrication means for supplying lubricant to the bearing surfaces between each cutter and journal assembly;
- an annular seal positioned within a gland between each cutter and journal assembly for preventing lubricant from leaking to the exterior of the assembly, said seal having a side which faces the exterior of the assembly;
- an annular ring positioned within each gland adjacent said side of the seal, each annular ring further extending across the axial clearance between the seal and the gland width, thereby restricting the axial movement of the seal.

12. The combination of claim 11 wherein each annular ring further includes a lip portion extending out of the gland into the clearance between the cutter and the journal.

13. A rotary rock bit comprising:
- a main bit body having at least one leg extending downwardly therefrom, each leg having a journal projecting radially inward therefrom, each journal having an outwardly facing bearing surface;
- a cutter rotatively mounted on each said leg journal, each cutter having an inwardly facing bearing surface engaging the bearing surface of said registering leg journal;
- lubrication means for supplying lubricant to the bearing surfaces between each cutter and journal assembly;
- an annular seal positioned within a gland between each cutter and journal assembly for preventing lubricant from leaking to the exterior of the assembly, said seal having a side which faces the exterior of the assembly;
- an annular ring positioned within each gland adjacent said side of the seal, each annular ring including a face adjacent a respective seal which is contoured to the shape of the mating seal face.

* * * * *